(12) United States Patent
Ozen et al.

(10) Patent No.: US 11,734,707 B2
(45) Date of Patent: Aug. 22, 2023

(54) REWARD MANAGER

(71) Applicant: Kleberg Bank, Kingsville, TX (US)

(72) Inventors: Cagri Ozen, Austin, TX (US); John Bradley Alan Womack, Kingsville, TX (US); Christopher Michael Medrano, Kingsville, TX (US); Dominic Jonah Fischer, Kingsville, TX (US)

(73) Assignee: Kleeberg Bank, Kingsville, TX (US)

( * ) Notice: Subject to any disclaimer, the term of this patent is extended or adjusted under 35 U.S.C. 154(b) by 0 days.

(21) Appl. No.: 17/305,937

(22) Filed: Jul. 16, 2021

(65) Prior Publication Data

US 2021/0342872 A1   Nov. 4, 2021

Related U.S. Application Data

(63) Continuation-in-part of application No. 16/745,737, filed on Jan. 17, 2020, now abandoned.

(60) Provisional application No. 62/793,760, filed on Jan. 17, 2019.

(51) Int. Cl.
| | |
|---|---|
| *G06Q 30/02* | (2023.01) |
| *G06Q 30/0207* | (2023.01) |
| *G06Q 40/02* | (2023.01) |
| *G06Q 20/40* | (2012.01) |
| *G06Q 20/02* | (2012.01) |
| *G06F 16/2455* | (2019.01) |
| *G06F 16/25* | (2019.01) |
| *G06F 9/50* | (2006.01) |

(Continued)

(52) U.S. Cl.
CPC ....... *G06Q 30/0215* (2013.01); *G06F 9/5038* (2013.01); *G06F 16/24553* (2019.01); *G06F 16/254* (2019.01); *G06Q 20/02* (2013.01); *G06Q 20/405* (2013.01); *G06Q 30/0235* (2013.01); *G06Q 40/02* (2013.01); *G06Q 30/0226* (2013.01)

(58) Field of Classification Search
CPC ....... G06Q 30/0207–30/0277; G06Q 30/0215; G06Q 20/02; G06Q 20/405; G06Q 30/0235; G06Q 40/02; G06Q 30/0226; G06Q 20/102; G06Q 10/10; G06Q 20/387; G06Q 30/0185; G06Q 30/0224; G06Q 10/087; G06F 9/5038; G06F 16/24553; G06F 16/254; G06F 16/248; G07F 17/0035
See application file for complete search history.

(56) References Cited

U.S. PATENT DOCUMENTS

| | | | | |
|---|---|---|---|---|
| 8,438,061 | B2 * | 5/2013 | Grimes | G06Q 30/0269 705/14.51 |
| 9,087,215 | B2 * | 7/2015 | LaFever | H04L 63/0407 |
| 9,830,612 | B2 * | 11/2017 | Hammock | G06Q 30/0242 |

(Continued)

FOREIGN PATENT DOCUMENTS

WO    WO 02/50705 A1 *  6/2002

*Primary Examiner* — Thuy N Nguyen
(74) *Attorney, Agent, or Firm* — Jacob B. Henry; Ramey LLP

(57) ABSTRACT

Disclosed is a rewards manager admin module to create, update and delete a campaign; a server-side application module responding to requests from the rewards manager admin module and to provide rewards; a server-side server containing data for the server-side application module to provide the rewards; and a bank core containing raw data of a consumer. The consumer is able to view the amount and type of rewards by viewing their account.

5 Claims, 4 Drawing Sheets

(51) Int. Cl.
*G06Q 30/0235* (2023.01)
*G06Q 30/0226* (2023.01)

(56) References Cited

U.S. PATENT DOCUMENTS

| | | | | |
|---|---|---|---|---|
| 9,942,267 B1* | 4/2018 | Tripathi | ................. | G06F 16/95 |
| 10,043,035 B2* | 8/2018 | LaFever | ................. | H04L 9/065 |
| 10,430,788 B2* | 10/2019 | Driggs | ................. | G06Q 20/223 |
| 10,783,537 B1* | 9/2020 | Parekh | ............... | G06Q 30/0211 |
| 10,937,088 B2* | 3/2021 | Streit | .................... | G06Q 40/02 |
| 11,157,954 B1* | 10/2021 | Belanger | ............ | G06Q 30/0201 |
| 11,250,459 B2* | 2/2022 | L'Huillier | ............... | G06Q 20/34 |
| 2002/0103660 A1* | 8/2002 | Cramon | ................ | G06Q 30/06 |
| | | | | 709/220 |
| 2010/0106598 A1* | 4/2010 | Grimes | ............. | G06Q 30/0269 |
| | | | | 705/14.53 |
| 2011/0022448 A1* | 1/2011 | Strock | ................ | G06Q 30/0241 |
| | | | | 705/14.1 |
| 2012/0109734 A1* | 5/2012 | Fordyce, III | ....... | G06Q 30/0239 |
| | | | | 705/14.25 |
| 2012/0191525 A1* | 7/2012 | Singh | ................. | G06Q 20/405 |
| | | | | 705/14.27 |
| 2012/0323656 A1* | 12/2012 | Leach | ............... | G06Q 30/0239 |
| | | | | 705/14.1 |
| 2013/0054433 A1* | 2/2013 | Giard | ..................... | H04L 63/08 |
| | | | | 709/224 |
| 2013/0325582 A1* | 12/2013 | Drozd | ............... | G06Q 30/0267 |
| | | | | 705/14.38 |
| 2014/0180808 A1* | 6/2014 | Boal | ................. | G06Q 30/0211 |
| | | | | 705/14.53 |
| 2014/0180819 A1* | 6/2014 | Grimes | ............. | G06Q 30/0269 |
| | | | | 705/14.58 |
| 2015/0058105 A1* | 2/2015 | Fonseca | ............ | G06Q 30/0226 |
| | | | | 705/14.17 |
| 2015/0193792 A1* | 7/2015 | Patel | ................. | G06Q 30/0276 |
| | | | | 705/7.32 |
| 2015/0348081 A1* | 12/2015 | VanHoozer | ......... | G06Q 20/405 |
| | | | | 705/14.27 |
| 2016/0171525 A1* | 6/2016 | Ezra | .................. | G06Q 30/0225 |
| | | | | 705/14.12 |
| 2016/0180030 A1* | 6/2016 | Gunawardena | ....... | G06Q 40/12 |
| | | | | 705/2 |
| 2017/0139996 A1* | 5/2017 | Marquardt | .......... | G06F 16/2272 |
| 2017/0308946 A1* | 10/2017 | Bursey | .................... | H04L 67/10 |
| 2017/0337583 A1* | 11/2017 | Grimes | ............. | G06Q 30/0269 |
| 2017/0365021 A1* | 12/2017 | Stading | ............... | G06Q 50/184 |
| 2018/0069925 A1* | 3/2018 | Lavasani | ................ | G06F 16/28 |
| 2019/0102430 A1* | 4/2019 | Wang | ...................... | G06N 7/01 |
| 2019/0146970 A1* | 5/2019 | Chamieh | ......... | G06F 16/24542 |
| | | | | 707/718 |
| 2019/0146977 A1* | 5/2019 | Thomas | ................. | G06Q 10/10 |
| | | | | 707/602 |
| 2019/0238424 A1* | 8/2019 | Guan | ..................... | H04L 41/5041 |
| 2020/0258108 A1* | 8/2020 | Ozen | ...................... | G06Q 10/10 |
| 2021/0342872 A1* | 11/2021 | Ozen | .................. | G06Q 30/0215 |

* cited by examiner

REWARD MANAGER

CROSS-REFERENCE TO RELATED APPLICATION

This is a continuation-in-part application of U.S. patent application Ser. No. 16/745,737 filed Jan. 17, 2020, which claims the benefit of U.S. Provisional Application No. 62/793,760, filed Jan. 17, 2019; the entirety of which are incorporated herein by reference.

FIELD

The disclosure relates generally to payment systems. The disclosure relates specifically to methods and systems for processing rewards.

BACKGROUND

Rewards are various practices, for example, providing discounts, designed to increase sales of a particular produce or services and the profit associated with such sales. Launching reward programs is one of the most effective ways for businesses to raise customer awareness, stimulate more sales, and increase brand loyalty.

The reward delivery mechanism for most loyalty programs has primarily been the use of store coupons, statement inserts, or other printed coupons that require a customer to redeem the coupon in a future purchase. Currently, it is estimated that the percentage of reward coupons that are redeemed by customers is less than 1% of the total coupons distributed. As card-based reward programs and benefits become more widespread, financial institutions and other entities are searching for more cost-effective ways to deliver value to their cardholders.

Kasasa™ checking accounts reward account holders in cash each month for doing banking basics, like paying with a debit card. Each account features a different reward, from cash back to refunds on online purchases. The reward process requires a manual process each month, if the process is not completed or not completed properly, the rewards are not paid.

Jack Henry & Associates, Inc. and Saylent Technologies, Inc. deliver a fully integrated customer rewards solution for Jack Henry & Associates' core clients. The rewards can increase profitability by attracting and retaining customers and deposits by offering high-interest checking, cash-back, and merchandise incentives that reward customers based on their banking relationships and posted account transaction activity during existing statement cycles. But changing of rewards and programs requires the vendor to intervene, testing is difficult, and calculations are compiled monthly.

It is desirable for a reward system to raise customer awareness. However, current rewards systems are too slow to provide rewards. The customers cannot get the incentives in time. It would be advantageous to develop a method and system to calculate rewards daily, thus providing customers near up-to-date monitoring of their incurred rewards. It would be advantageous to develop a system for incentive campaigns that pay rewards to the customer monthly.

SUMMARY

The present invention is directed to a method and system for processing rewards. In one aspect, the invention is directed to a rewards platform, comprises a server adapted to managing offers; a plurality of client systems; a network connecting between the server and the plurality of client systems. the server includes a consumer management module, a transaction management module, an offer provider management module, a reward mapping module and a data access module.

In some embodiments, the rewards platform further comprises a customer database rewards configuration database.

In some embodiments, the consumer management module manages identifying information for each consumer accessing the server; the offer provider management module manages identifying information representing a merchant that accesses the server; the transaction management module monitors or track various product item-level transaction information as the transaction information are received into the server. the reward mapping module matches offers defined or generated by various manufacturers, merchants, retailers with one or more consumers based on previous purchases of items by the customers.

In another aspect, an embodiment is directed to a rewards method, comprises calculating rewards totals to pay back to customers by mapping a transactional data pulled from a core system to user defined rewards definitions through a relational database structure.

In some embodiments, the method comprises pulling the transactional data from a core system through a Microsoft® SQL Server® Integration Services (SSIS) package and placed into a staging table within a local database; taking the user defined rewards definitions and through the relational structure of the database maps the individual transactions to an appropriate reward; calculating the amount of rewards to give back to each eligible account and generates a report of the reward. In some embodiments, the calculating is run daily.

In yet another aspect, an embodiment is directed to a reward management system, the system comprises a rewards manager admin module to create, update and delete a campaign; a server-side application module responding to requests from the rewards manager admin module and to provide rewards; a server-side service containing data for the server-side application module to provide the rewards; a bank core containing raw data of a consumer and a client side for the consumer to view the rewards.

In some embodiments, the rewards manager admin module comprises a user interface. The server-side application module comprises: a bank configuration module to store bank information, server and product details, transaction and payout transaction codes; a campaign configuration module to create and maintain the campaign; a rewards module consuming campaign configuration, transactions, accounts and customers details and calculating rewards per customer account; a campaign maintenance module to activate or deactivate the campaigns on set dates; a payout module posting the rewards amount to the bank core; a job manager module monitoring task for the server-side application module. The rewards module comprises: a rewards mapping module running queries on transaction data based on the campaign and mapping a transaction to the campaign; a rewards calculation module retrieving mapped data and campaign details and calculating rewards amount; a campaign maintenance module to activate or deactivate the campaigns on set dates. The server-side server comprises a rewards database and an ETL module. The rewards database comprises a campaign details table storing rules of the campaign, a transaction table, an account details table, a customer details table, a mapping table, a reward table and a report table.

In yet another aspect, an embodiment is directed to a rewards method, comprising the steps of: creating a campaign and define rules for the campaign to form a campaign details table; retrieving a first data of a customer from a bank core and inserting the data to update a base table comprising a transaction table, an account details table and a customer details table; retrieving a second data from the campaign details table and the base table and mapping transaction data to form a mapping table; retrieving the second data from the campaign details table and the mapping table to determine rewards of an account of the customer and storing the rewards to a rewards table; retrieving the rewards from the rewards table and post the rewards to the bank core; posting a rewards amount to the account of the customer.

In an embodiment, the method can be used in a B2B commerce transaction.

The benefit of the present disclosure comprises: allowing user visibility intermonth; rewards setup is easily managed by non-technical people and 100% driven without developer input; Intuitive User Interface uses common banking terms to allow operations and salespeople to easily develop new rewards; new reward ideas easily can be tested for profitability analysis without affecting live accounts.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure can be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

Figure 1:
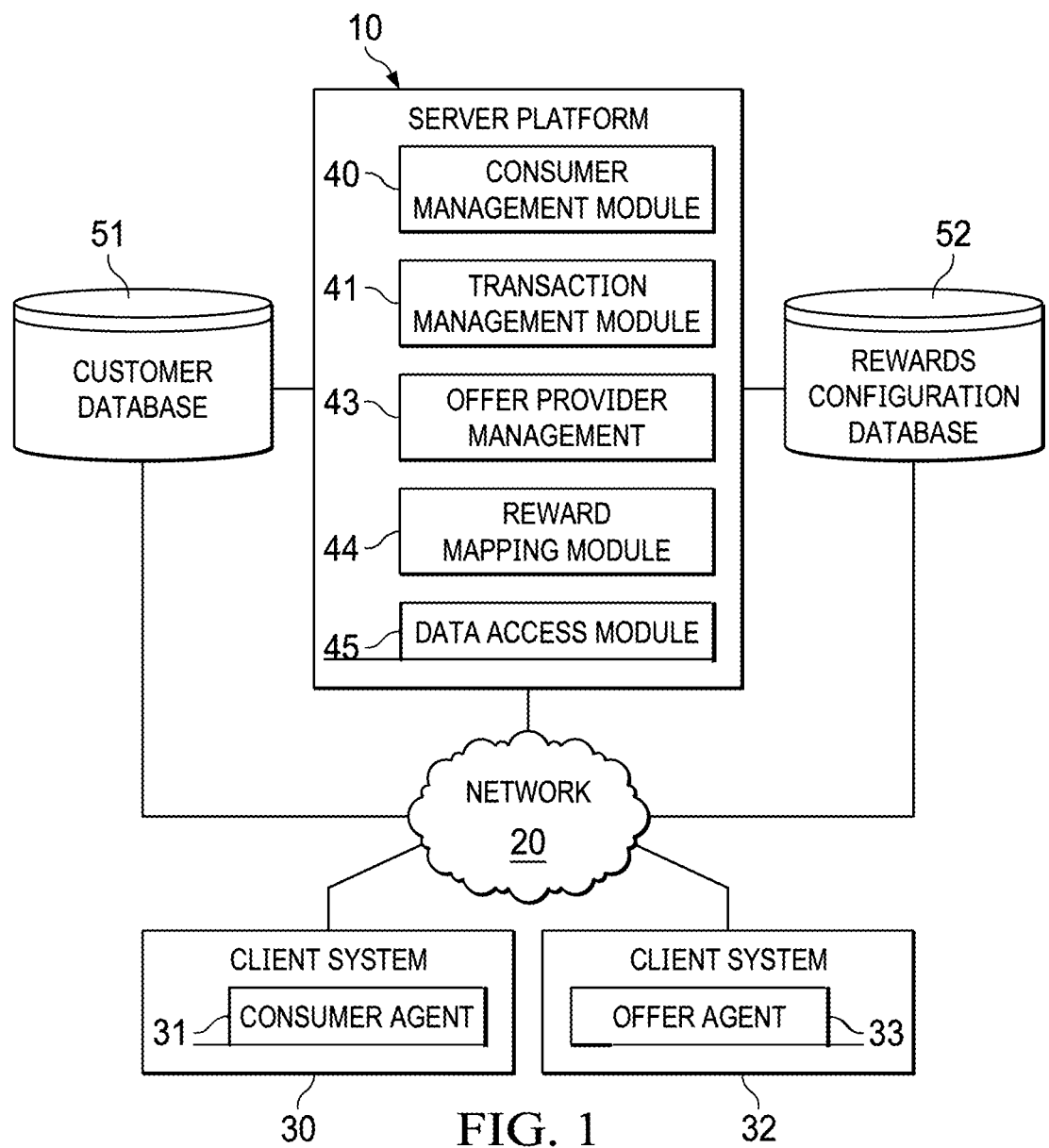
FIG. 1 is a block diagram illustrating a system for processing rewards.

FIG. 1 is a block diagram depicting a system, according to an embodiment, having a client-server architecture configured to perform the various methods described herein. A platform (e.g., including but not limited to machines and software, possibly interoperating via a series of network connections, protocols, and application-level interfaces). In an embodiment, a server platform 10, provides server-side functionality via a communication network 20 to one or more client systems 30, 32. In some embodiments, the network 20 can be a wide area network, local area network, the Internet, or other suitable data communications networks. FIG. 1 illustrates, for example, a client system 30 hosting a consumer agent 31, thus allowing a consumer to access those functions of the server platform 10 applicable to the consumer, including, for example, transaction data storage, offer receipt and redemption, and so on. Another client system 32, hosts an offer agent 33 that facilitates use of the server platform 10 applicable to manufacturers, merchants, retailers, and so on, for specifying, tracking, and otherwise managing offers.

In an embodiment, the server platform 10 can be one or more computing devices or systems, storage devices, and other components that include, or facilitate the operation of, various execution modules depicted in FIG. 1. These modules can include, for example, a consumer management module 40, a transaction management module 41, an offer provider management module 43, a reward mapping module 44, and a data access module 45. In some embodiments, the computer system can include a Web server that is able to host a Web site thereon and a number of Web based applications associated with the Web site, such as a user profile generator. In these embodiments, the clients can access the server simply by connecting to the Internet and opening the appropriate URL address of the Web site. The server platform 10 can include an interface/API module, which can provide a web interface, an API, or another type of interface facilitating access by the client systems 30, 32 to the various modules of the server platform 10.

The server platform 10 has access to or is otherwise able to query a customer database 51 containing various types of information of customers and rewards configuration database 52 containing various type of rewards information. The customer database 51 carries information about the customer, the information can include demographic characteristics such as age, gender, marital status, and education level of the customer. The information can also include a traveler's contact information, credit card information, and transaction record. The rewards configuration database 52 carries information about reward scheme provided by manufacturers, merchants or retailers. Wherein a reward scheme consists of the details of the reward and criteria for offering the reward to a customer. The information can include a discount on a product or service, loyalty points, freebies, product warranties, tie-in promotions, cross selling, up selling, and premiums. The data access module 45 can facilitate access to databases 51 and 52 by any of the modules of the server platform 10.

Although the databases 51 and 52 are shown to reside externally to the platform 10, those of ordinary skill in the art will understand that the databases can also be integrated into the server platform 10.

The consumer management module 40 can manage identifying information for each consumer accessing the server platform 10. The identified information can include names, passwords, contact information, and additional information pertaining to the consumers. In some examples, this additional information can include user preference information, demographic information, previous purchase information, and other data related to the particular user. In one embodiment, the information associated with each consumer can be stored or retrieved from the customer database 51. The offer provider management module 43 can manage identifying information representing a manufacturer, merchant, retailer, or similar entity that accesses the server platform 10. The identified information can include names, passwords, contact information, and other information pertaining to the manufacturer or other entity. The offer provider management module 43 can also receive parameters regarding one or more offers on products or services devised by manufacturers, retailers, and other entities. In an example, such parameters can include the type of offer (e.g., including but not limited to a discount on a product or service, loyalty points, freebies, product warranties, tie-in promotions, cross selling, up selling, and premiums). The products to be purchased and any customer attributes that would trigger the delivery of an offer to a consumer, the terms of the reward or incentive resulting from triggering the offer, any expiration date or time associated with the offer, and so on. The user of the offer client system 32 can devise such offers, modify the offers in response to interim results regarding the offer, and engage in related activities via the offer provider management module 43. In one implementation, the information associated with each offer can be stored to and retrieved from the rewards configuration database 52.

The transaction management module 41 can monitor or track the various product item-level transaction information as they are received into the server platform 10. The transaction information can be received from a number of sources, such as paper receipts held by the consumer; electronic transaction data provided by a merchant, a payment service provider, and a third-party aggregator. The transaction information can include, but not limited to, the name of the product, the product ID, unit price and quantity of the product, the name of the provider, the Customer name, transaction Card ID. In one embodiment, the information associated with each transaction can be stored or retrieved from the customer database 51.

In one example, the consumer operating the consumer client system 30 can scan and/or photograph a paper receipt, the resulting image of which is then processed to generate data identifying the various items purchased. In other examples, the consumer client system 30 can receive an electronic receipt or similar data from a retailer. Such information can be received as information displayed on a webpage to the consumer, as text provided in an e-mail message, or other communication and/or electronic record transmitted to the consumer. In one embodiment, the transaction is made via a website, a browser application executing on the consumer client system 30 can record purchases made by the consumer via the consumer client system 30. the transaction data can be sent to the transaction management module 41 via the communication network 20 and stored into the customer database 51.

The reward mapping module 44 can match offers defined or generated by the various manufacturers, merchants, retailers, or other entities with one or more consumers based on previous purchases of items by the customers, as set forth by the parameters defining the offers. The reward mapping module 44 can also consider other factors in matching offers to consumers, such as the demographic details of the consumers, their user preferences, locations where they have shopped previously, and other information associated with the consumers.

Figure 2:
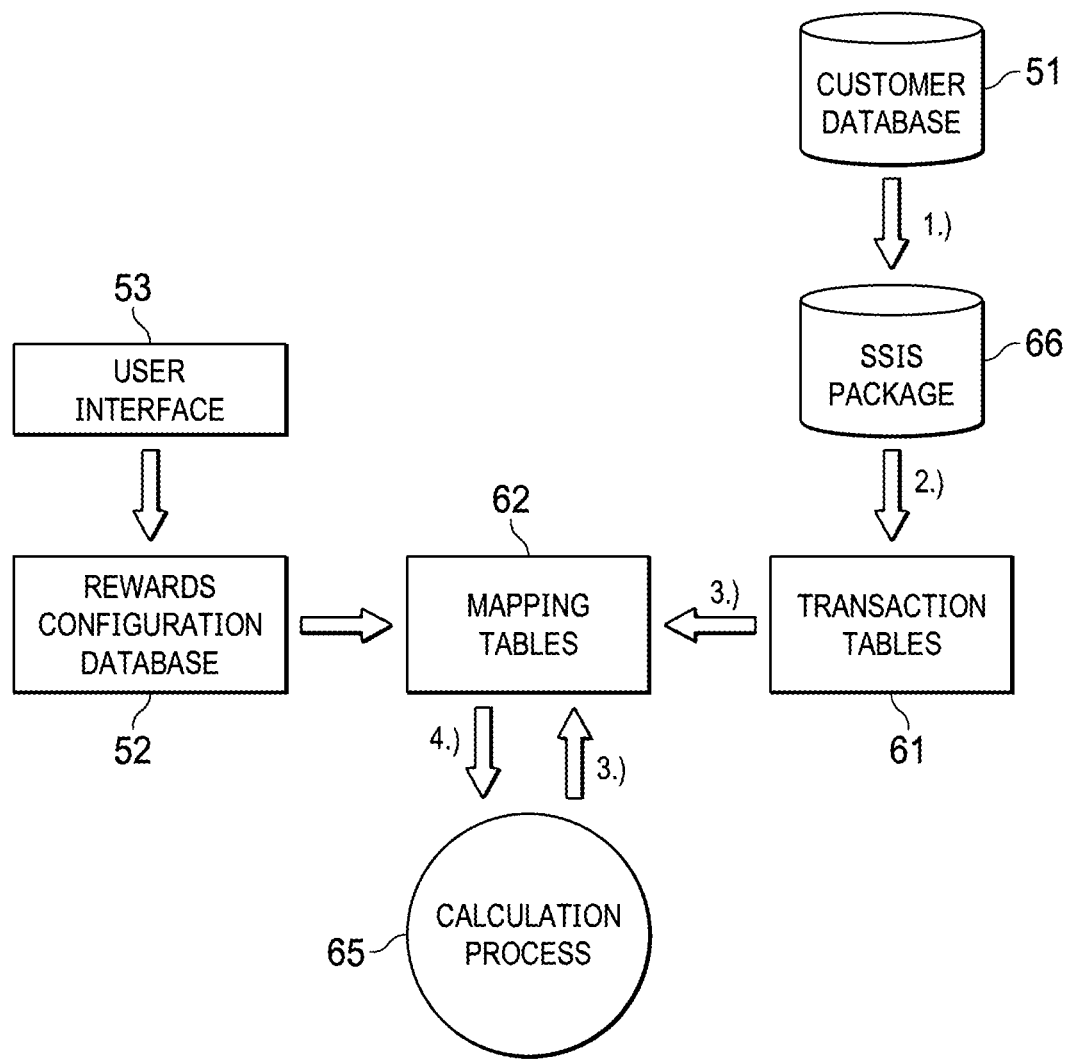
FIG. 2 is a block diagram illustrating a method for processing rewards.

In an embodiment, a manufacturer, retailer, or other commercial entity can communicate with the offer provider management module 43 via the client system 32 and the user interface 53, to specify and/or modify purchase offers for products or services. FIG. 2. The resulting offer data are stored in the rewards configuration database 52. The reward mapping module 44 can then access portions of the offer data from the rewards configuration database 52, transaction data from the customer database 51, to match current offers with one or more consumers represented in the customer database 51. The rewards platform calculates rewards totals to pay back to customers by mapping transactional data pulled from a core system to user defined rewards definitions through a relational database structure.

The transactional data is pulled from a core system (for example, the customer database 51) through an SSIS package 66 and placed into a staging table within a local database. The relational database is a collection of data items organized as a set of tables with each table organized into columns and rows. For example, a staging transaction table 61 for a customer in a specific date extracted from the customer database 51 is shown as Table 1.

TABLE 1

| Customer name | Customer-ID | Card ID | Product name | Product ID | Unit price | Quantity | Provider | Provider ID | Date |
|---|---|---|---|---|---|---|---|---|---|
| Pat | 12 | 25 | Apple | 23 | $1.39 | 2 | Walmart | 46 | Jan. 2, 2018 |
| Ken | 12 | 23 | Cinema ticket | 1 | $6.99 | 3 | AMD | 21 | Jan. 2, 2018 |
| Mary | 12 | 25 | Tomato | 5 | $2.49 | 3 | Costco | 14 | Jan. 2, 2018 |
| Chris | 12 | 23 | Orange | 6 | $1.49 | 6 | Costco | 14 | Jan. 2, 2018 |

Then, an offer data in a specific date is extracted from the rewards configuration database 52 which is shown as Table 2.

TABLE 2

| Product name | Product ID | Unit price | Quantity | Provide offer | Provider | Provider ID | Date |
|---|---|---|---|---|---|---|---|
| apple | 23 | $1.39 | 2 | Null | Walmart | 46 | Jan. 2, 2018 |
| cinema ticket | 1 | $10.99 | 3 | Refunds $2 | AMD | 21 | Jan. 2, 2018 |

TABLE 2-continued

| Product name | Product ID | Unit price | Quantity | Provide offer | Provider | Provider ID | Date |
|---|---|---|---|---|---|---|---|
| tomato | 5 | $2.49 | 3 | 20% discount | Costco | 14 | Jan. 2, 2018 |
| orange | 6 | $1.49 | 6 | 10% discount | Costco | 14 | Jan. 2, 2018 |

A mapping process 65 is run that takes the user defined rewards definitions and through the relational structure of the database maps the individual transactions to the appropriate reward.

Next, these mappings are consumed in a calculation process that tallies up the amount of rewards to give back to each eligible account and generates a report of the rewards breakdown to form a mapping table 62. Table 3 shows the result of rewards to give back to each eligible account.

TABLE 3

| Customer name | Card ID | Product name | Product ID | Unit price | Quantity | Provider | Provide offer | Refunds | Date |
|---|---|---|---|---|---|---|---|---|---|
| Ken | 23 | cinema ticket | 1 | $6.99 | 3 | AMD | Refunds $2 | $6 | Jan. 2, 2018 |
| Mary | 25 | tomato | 5 | $2.49 | 3 | Costco | 20% discount | $1.494 | Jan. 2, 2018 |
| Chris | 23 | orange | 6 | $1.49 | 6 | Costco | 10% discount | $0.894 | Jan. 2, 2018 |

In an embodiment, the data transfer from core, mapping and calculation processes is run daily, thus providing customers near up-to-date monitoring of their incurred rewards. In an embodiment, the rewards are paid to the customer on a monthly basis.

The reward management system of the present disclosure can not only be used in the business-to-consumer (B2C) commerce transaction which includes selling products and services directly between a business and consumers who are the end-users of its products or services. The system can also be used in a business-to-business (B2B) commerce transaction.

Figure 3:
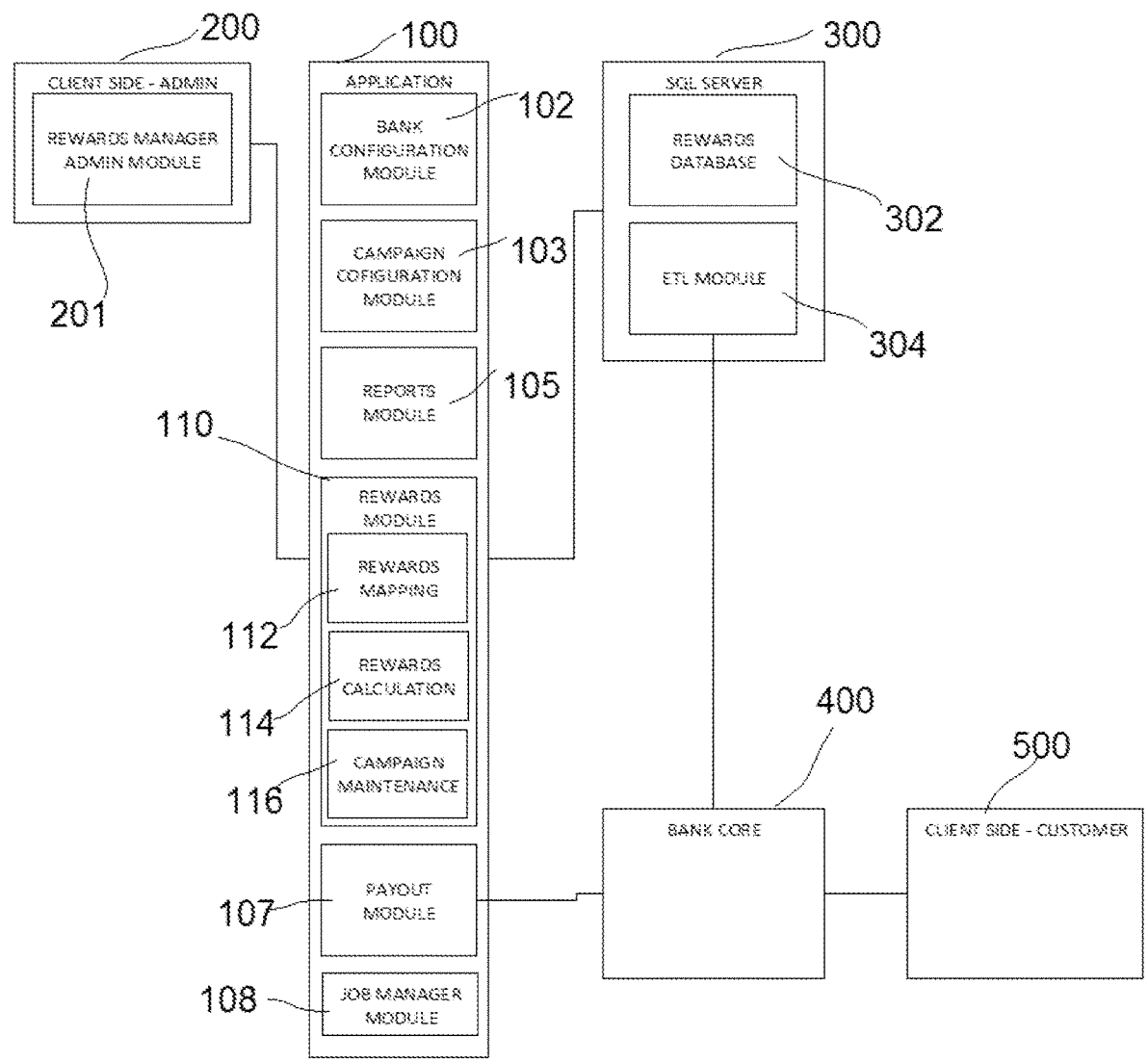
FIG. 3 is a block diagram illustrating a reward management system.

FIG. 3 is a block diagram depicting a structure of a reward management system according to a variant embodiment of the present disclosure. In FIG. 3, reference numeral 200 denotes a client-side admin which includes a rewards manager admin module 201, the rewards manager admin module 201 comprises a user interface that enables a banker (Product Manager) to create, update and delete campaigns such as reward projects. Daily and monthly reports can be viewed by the product manager through the user interface. Various configurations related to rewards manager such as product codes, transaction types etc. can be made. Health of the daily and monthly jobs can be monitored. Various jobs can be run such as daily and monthly recalculation by the rewards manager admin module 201.

A server-side provides server-side functionality via a communication network to the client-side admin 200. The server-side comprises two sections, the server-side application module 100 and the server-side server 300. Server-side application module 100 can include any type of computing device or multiple computing devices. The computing device includes at least one processor and memory that executes software. The software includes a plurality of functional modules to respond to requests from the client-side and complete the corresponding function to provide rewards to a customer. These functional modules include, but are not limited to, a bank configuration module 102, a campaign configuration module 103, a reports module 105, a rewards module 110, a payout module 107 and a job manager module 108.

The bank configuration module 102 is formed to store bank information, server and product details, transaction and payout transaction codes and some other base configuration elements which can be configured in this module. The server-side application module 100 employs a campaign configuration module 103 to create and maintain a campaign. Some of the data that is configured in bank configuration module 102 are consumed in this module such as product details or transaction codes. When new campaigns are created, a banker defines rules and target different products with different constraints through the user interface of rewards manager admin module 201. A reports module 105 can report details of the transactions daily and monthly to a product manager, the product manager can see historical report details and comparisons at a glance via data visualization on a screen of user interface in the rewards manager admin module 201.

The rewards module 110 includes, but is not limited to, the following modules: rewards mapping module 112, rewards calculation module 114 and campaign maintenance module 116. The rewards module 110 can be summarized as the core of the system. At a high level, the rewards module 110 consumes campaign configuration, transactions, accounts, and customers details and calculates rewards per customer account on a daily basis. Campaign maintenance includes, but is not limited to, activation or deactivation of a campaign on a given date and is done in an automated fashion within this module.

The rewards mapping module 112 retrieves all the transaction and campaign details from rewards database 302 which will be discussed hereinafter. The rewards mapping module 112 runs queries on transaction data based on a campaign ruleset and constraints and map qualified transactions (result sets of queries) to relevant campaigns on a daily basis for later use. Rewards calculation module 114 retrieves mapped data and campaign details and calculates reward amounts that will be paid out per account on a daily basis. In an embodiment, the reward amounts are paid out per account on a monthly basis. Calculated amounts are stored in rewards database 302 for later use. Campaign maintenance module 116 performs automated campaign maintenance. That is, a product manager sets the start and end date when the product manager creates a new campaign through the user interface of the rewards manager admin module 201. Campaign maintenance module 116 activates or deactivates campaigns on set dates.

Payout module 107 can retrieve from rewards database 302 previously calculated rewards amounts and post to bank core 400 in various forms. Then, bank core 400 can read this data and post rewards amount to customer's account. Job manager module 108 can monitor tasks in the reward management system. The reward management system can have multiple recurring tasks for different purposes. Jobs which can be daily, monthly or on demand frequency depend on the task that it completes. Status of these tasks can be monitored via job manger module 108.

In some embodiments, the server-side server 300 is a database management system based on a SQL server. The SQL Server is a relational database management system developed by Microsoft. As a database server, it is a software product with the primary function of storing and retrieving data as requested by other software applications—which may run either on the same computer or on another computer across a network (including the Internet). In an embodiment, the server-side application module 100 and the server-side server 300 communicate through a network.

The server-side server 300 comprises a rewards database 302 and an extraction, transformation, and load (ETL) module 304. The rewards database 302 contains all the data which the reward management system needs such as bank configuration, campaign details, reports, rewards mapping, calculated rewards amount and recurring jobs details. In some embodiments, referring to FIG. 4, the data in the rewards database 302 are contained in multiple tables such as campaign details table 312, base table 322, mapping table 332, rewards table 342 and report table 352. The detail of the tables will be illustrated hereinafter.

ETL is a type of data integration that refers to the three steps (extract, transform, load) used to blend data from multiple sources. It is often used to build a data warehouse. During this process, data is taken (extracted) from a source system, converted (transformed) into a format that can be analyzed, and stored (loaded) into a data warehouse or other system. Extract, load, transform (ELT) is an alternate but related approach designed to push processing down to the database for improved performance.

In some embodiments, ETL module 304 comprises Microsoft® SQL Server® Integration Services (SSIS) packages that retrieves raw data such as transaction, account, and customer details from the bank core 400 and "inserts" them to relevant rewards database tables. Microsoft® SQL Server® Integration Services (SSIS) is a platform for building high-performance data integration solutions, SSIS includes graphical tools and wizards for building and debugging packages; tasks for performing workflow functions such as FTP operations, executing SQL statements, and sending e-mail messages; data sources and destinations for extracting and loading data; transformations for cleaning, aggregating, merging, and copying data; a management database for administering package execution and storage.

Bank core 400 stores information of customers' accounts. Rewards manager application consumes the bank core. The ETL module 304 retrieves raw data, processes them and uploads the generated result set back to bank core 400. The bank core processes the uploaded document and posts rewards amounts to customers' accounts.

The client side 500 communicates with the bank core 400 via a communication network. On the client side 500, a customer agent such as a mobile/web app can allow a customer to access those functions of the server applicable to a customer. The customer can view the rewards amount on their account when they login to their account via mobile/web app or on their bank statements. In an embodiment, the customer cannot maintain campaigns on their end.

Figure 4:
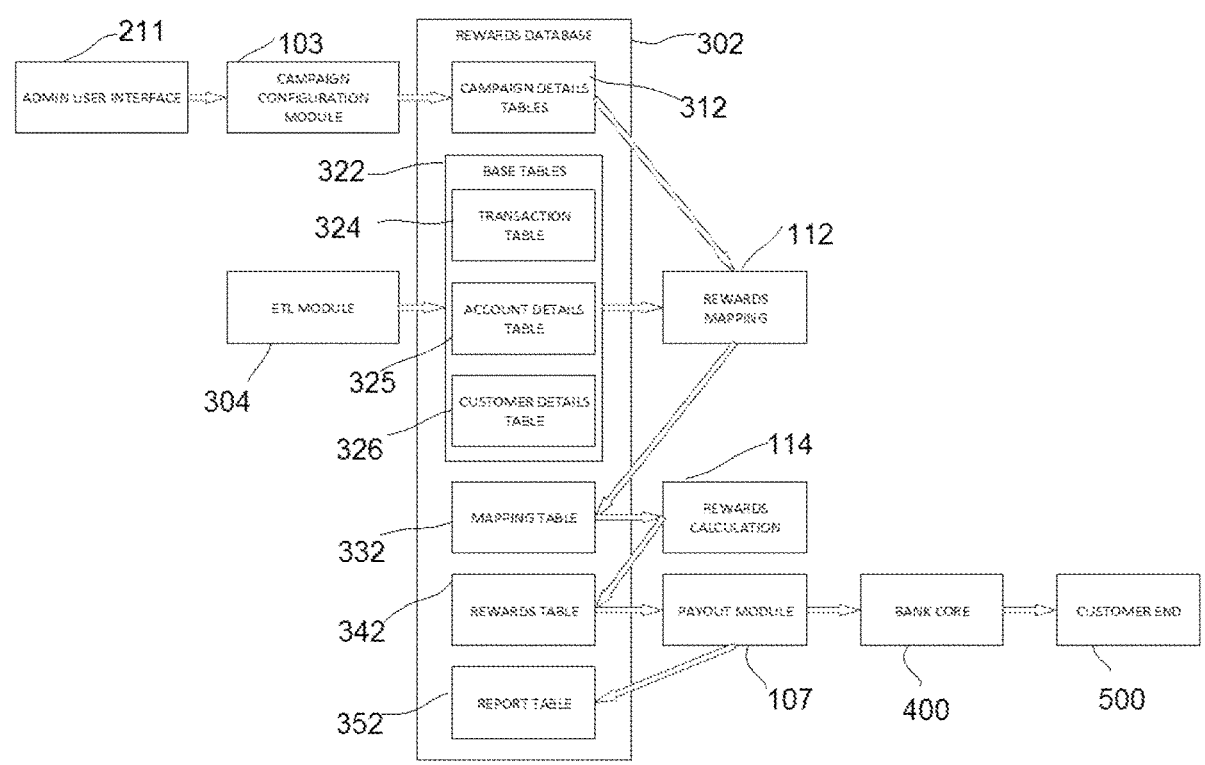
FIG. 4 is a block diagram illustrating a method for processing rewards through the reward management system in FIG. 3.

FIG. 4 describes an embodiment of the process to provide rewards to customers. In an embodiment, the product manager can login to the rewards manager admin module 201 (FIG. 3), the module 201 comprises a user interface 211 that enables the product manager to create a campaign and define rules such as: selecting an account type for a certain target product and setting up a reward promotion on the product. For example, 5 cents reward per transaction above $10 and if the number of transactions per month is above 50, then 10 cents per transaction above $10. The campaign configuration module 103 can help the product manager to create the campaign, such as provide product details or transaction codes extracted from bank configuration module 102 (FIG. 3) to the product manager. These rules and related information are stored in a campaign details table 312 of rewards database 302.

The rewards database 302 has base tables 322 including, but not limited to, transaction table 324, account detail tables 325 and customer details table 326 related to customer. ETL module 304 retrieves a first data of customers such as customers' accounts and transaction records from the bank core 400 and inserts them into base tables 322 to update transaction table 324, account details tables 325 and customer details table 326 related to customer. Transaction table 324 includes, but is not limited to, the transactions of by the customer, account details tables 325 records all the account information such as account ID of the customer and customer details table 326 records customer details such as name and address of customers.

The job manager module 108 (FIG. 3) can run daily tasks and triggers rewards mapping 112 functionality which retrieves a second data such as campaign rules from campaign details tables 312 and base tables 322 then runs queries to map qualified transactions data and inserts them into a mapping table 332. Mapping table 332 is basically a bridge table that connects account data of the customer to transaction data of the customer that is eligible to get rewards based on the campaign rules that are defined. That is, the mapping table 332 merges the information based on the record information of the campaign details tables 312 and base tables 322.

The job manager module 108 (FIG. 3) can then run daily tasks and triggers rewards calculation 114 functionality which retrieves the second data from campaign details tables 312 and mapping tables 332 to determine which account will receive how much rewards based on campaign details. Calculated amounts of the rewards are stored in rewards table 342 for later use.

The job manager module 108 can arrange daily, weekly, or monthly task. In one embodiment, a monthly task triggers payout module 107 (FIG. 3) which retrieves rewards data from the rewards table and formats it to post this information to bank core 400 and report table 352 for reporting and data visualization purposes. The bank core 400 reads uploaded information and posts rewards amounts to customers' accounts during a nightly process. On the client side 500, a customer can view the reward amount on their account when they login to their account via mobile/web app or on their bank statements.

In some embodiments, the customer details table 326 carries profile information about the customer, the information can include preferences of the customer, demographic characteristics such as age, gender, marital status, and education level of the customer. In order to understand customers and provide rewards to better match customers' needs and wants, the customer details table 326 also carries customer segmentation. Customer segmentation is the process of dividing customers into different groups based on their data. The process involves finding relevant characteristics that divide a market into smaller consumer groups. For example, the market segmentation of customers can include geography (where they are), demography (age, sex, occupation, income) and behavior (how much they spend/consume, products/services they use).

The rewards module 110 can utilize customer profile information and customer segmentation to provide rewards to the customer. In this case, the campaign configuration module 103 sets rules for rewards which will be relate to profile and segmentation of customer. For example, if a customer is a student and is shopping for school supplies, the customer can get more rewards per transaction than others that are not students. Rewards mapping module 112 retrieves all of the transaction and campaign details from rewards database 302 and calculates the reward amounts that will be paid out.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations can be applied to the compositions and methods and in the steps or in the sequence of steps of the methods described herein without departing from the concept, spirit and scope of the disclosure. More specifically, it will be apparent that certain options which are related can be substituted for the options described herein while the same or similar results would be achieved. All such similar substitutes and modifications apparent to those skilled in the art are deemed to be within the spirit, scope and concept of the disclosure as defined by the appended claims.

What is claimed is:

1. A rewards method, comprising
providing a server-side server, the server-side server comprising an extract-transform-load module;
creating, at the server-side server, a campaign and defining rules for the campaign to form a campaign details table;
retrieving, using the extract-transform-load module, accounts and transaction data of a customer from a bank core; and
converting, using the server-side server, the accounts and transaction data into a format that can be analyzed;
inserting, using the server-side server, the accounts and transaction data into a base table comprising a transaction table, an account details table, and a customer details table;
retrieving, using the server-side server, the rules from the campaign details table and the base table and mapping transaction data to form a mapping table;
retrieving, using the server-side server, the rules from the campaign details table and the mapping table to determine rewards of the accounts of the customer and storing the rewards to a rewards table;
retrieving, using the server-side server, the rewards from the rewards table and posting the rewards to the bank core;
posting, using the server-side server, a rewards amount to the account of the customer; and
wherein the campaign details table comprises customer profile information and customer segmentation.

2. The method of claim 1, wherein the method is used in a business-to-business commerce transaction.

3. The method of claim 1, wherein creating the campaign and defining rules for the campaign to form the campaign details table comprises providing a rewards manager module to create, update and delete the campaign.

4. The method of claim 3, wherein providing the rewards manager module comprises providing a rewards mapping module running queries on transaction data based on the campaign and mapping a transaction to the campaign.

5. The method of claim 4, wherein providing the rewards manager module further comprises providing a campaign maintenance module to activate or deactivate the campaign on set dates.

* * * * *